United States Patent
Jung

[15] 3,652,245
[45] Mar. 28, 1972

[54] FURNACE FOR MAKING FUSED QUARTZ HOLLOW SLUGS

[72] Inventor: Lothar Jung, Millington, N.J.
[73] Assignee: Amersil Inc., Hillside, N.J.
[22] Filed: Sept. 22, 1970
[21] Appl. No.: 74,425

[52] U.S. Cl. ..................65/157, 65/18, 65/153, 65/337, 65/339, 65/346, 65/374, 65/DIG. 8, 65/DIG. 4
[51] Int. Cl. ..................C03b 5/22, C03b 23/20
[58] Field of Search ..............65/DIG. 3, DIG. 8, DIG. 4, 65/86–89, 18, 157, 153, 339, 337, 346, 374

[56] References Cited

UNITED STATES PATENTS

| | | | |
|---|---|---|---|
| 1,068,716 | 7/1913 | Voelker et al. | 65/18 X |
| 1,232,785 | 7/1917 | Frost | 65/18 X |
| 3,404,973 | 10/1968 | Hedelec | 65/18 X |
| 2,027,155 | 1/1936 | Devers | 65/86 |
| 2,930,098 | 3/1960 | Emeis | 65/DIG. 4 |
| 3,261,676 | 7/1966 | Morelock | 65/18 |

Primary Examiner—Frank W. Miga
Attorney—Samuel Kahn and John G. Kovalich

[57] ABSTRACT

A furnace for making fused quartz hollow slugs comprising a cylindrical tubular housing having closure means at both ends, a quartz tube mounted coaxially in the housing in spaced relationship with the housing, the tube passing through the closure means in vacuum-tight relationship therewith and forming an annular charge chamber between the quartz tube and the wall of the housing, an elongated electrical resistor heating means mounted in the quartz tube in spaced relationship and coaxially of the quartz tube, the inner space of the quartz tube being open to either atmospheric air pressure or to an atmosphere of controlled pressure and chemical composition suitably applied, and vacuum means communicating with the charge chamber for vacuumizing the charge chamber.

9 Claims, 1 Drawing Figure

PATENTED MAR 28 1972  3,652,245
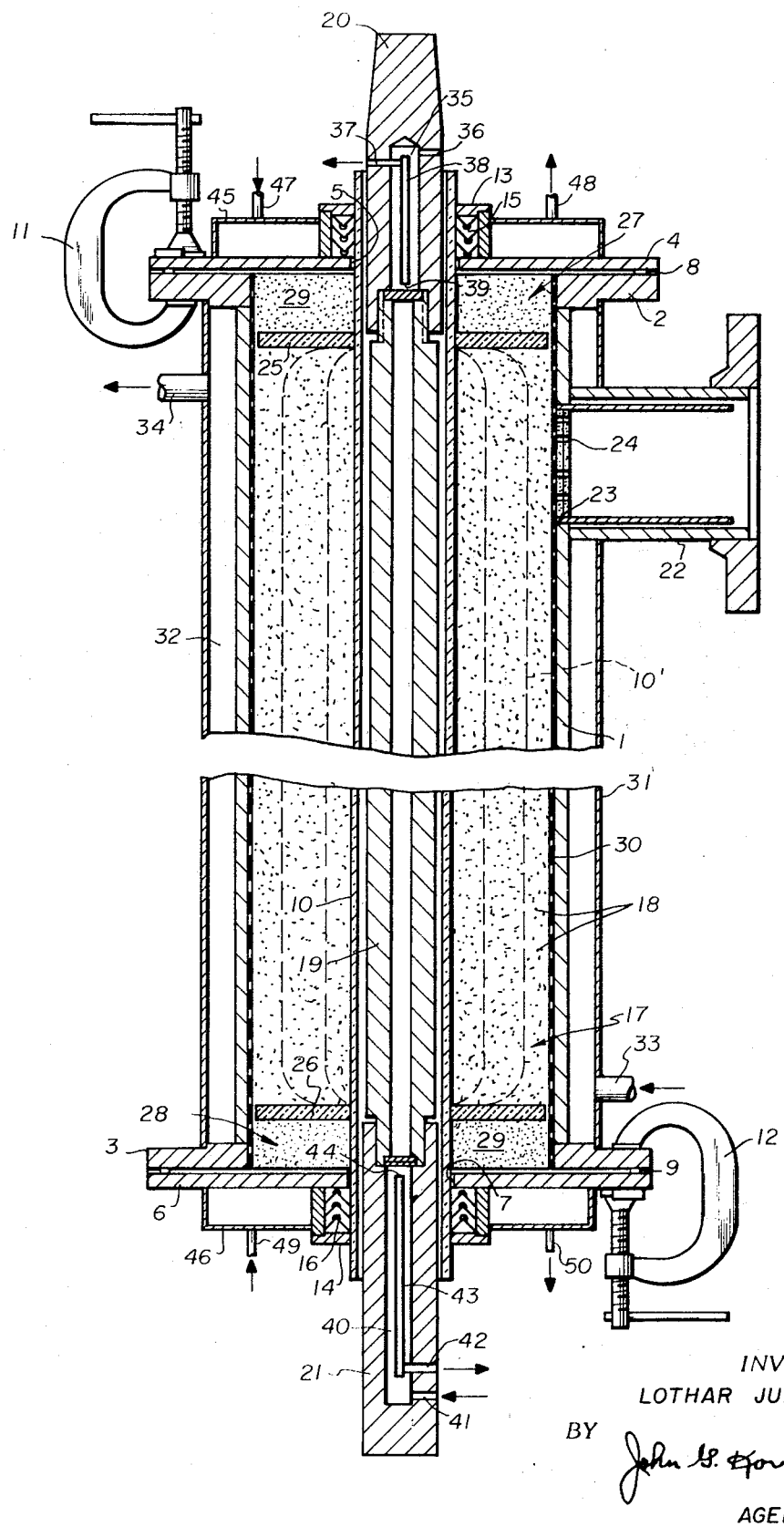
INVENTOR.
LOTHAR JUNG
BY John G. Kowalich
AGENT

FURNACE FOR MAKING FUSED QUARTZ HOLLOW SLUGS

BACKGROUND OF THE INVENTION

Essentially waterfree clear fused quartz tubing has been required for optical applications. In other applications, such as high temperature furnaces, OH-free tubing has shown a greater configurational stability than OH-containing materials of identical dimensions.

Electrically generated heat has been applied in vacuum furnaces to fuse quartz crystal powder to slugs, even hollow slugs. However, practice has shown that generally such a process is usually limited to dimensions, quantity and quality of the fused material because the actual heat source is in close contact with the charge powder material, and therefore, adding to the basic impurities of the crystal powder. In cases where the powder material has been fused solid, a second high temperature treatment was necessary in order to pierce a hollow slug therefrom, unless a tube drawing tower with a die was used.

Another known process separates the heat source, such as in an electric furnace, from the melt by containing the powder in evacuated clear fused quartz tubing which travels through the furnace. In such case, a substantially complete removal of water from the powder charge cannot be achieved. The OH-content is not even as low as material produced with heat supplied by the use of hydrogen-containing fuel gases. Furthermore, the slugs thus produced are solid and have to be pierced for tube drawing, which complicates the production of clear fused quartz tubing.

SUMMARY OF THE INVENTION

In accordance with the invention, there is provided a furnace for making fused quartz hollow slugs comprising a cylindrical tubular water-jacketed housing having closure means, such as end caps, clamped in vacuum-tight relationship on both ends of the housing. A coaxial quartz tube, e.g., a tube of clear fused quartz, is mounted in the housing spaced from the housing inner wall and with end portions thereof passing through the closure means or end caps with the outer surface of the tube in vacuum-tight relationship with the end caps thereby forming an annular charge chamber between the outer surface of the quartz tube and the inner wall of the housing. An elongated electrical resistor heating means, e.g., a carbon or graphite rod or tube, is mounted in the quartz tube spaced from and coaxially thereof. The inner space of the quartz tube is open to either the ambient atmosphere or to an atmosphere of controlled pressure and chemical composition suitably applied. Electrode means are connected to both ends of the resistor means and vacuum means is provided for communication with the charge chamber through the wall of the housing for vacuumizing the charge chamber.

DESCRIPTION OF THE DRAWING

The FIGURE illustrates a cross-sectional view of a furnace for making fused quartz hollow slugs according to the invention.

DESCRIPTION OF THE PREFERRED EMBODIMENTS

Referring to the FIGURE, the furnace of the invention comprises a cylindrical tubular housing 1 having circular flanges 2 and 3 at the opposite open ends thereof. A closure means in the form of a cap or plate 4 having a central aperture 5 therethrough is mounted on flange 2 across the open end of the housing. Another closure means in the form of a cap or plate 6 having a central aperture 7 therethrough is mounted on flange 3 across the other open end of the housing. An O-ring 8 is mounted between plate 4 and flange 2 and O-ring 9 is mounted between plate 6 and flange 3. A coaxial quartz tube 10, e.g., of fused quartz, is mounted in the housing 1 coaxially thereof and spaced from the inner wall of the housing 1. The tube 10 extends outwardly of both ends of the housing 1 through the apertures 5 and 7 in the end closure plates 4 and 6. The end closure plates are clamped to their respective flanges by C-clamps 11 and 12. While only two of these clamps are illustrated, actually a plurality of the C-clamps are employed at each end of the housing. Annular housings 13 and 14 are mounted one each on their respective plates 4 and 6 around the apertures 5 and 7 and portions of the tube 10 extending outwardly of the apertures. The annular housings contain a suitable packing means or gasket means 15 and 16, e.g., of silicone rubber or Viton material, for providing a vacuum-tight relationship between the closure plates and the quartz tube 10. As illustrated, the positioning of the tube 10 coaxially and spaced from the wall of the housing 1 provided a charge chamber 17 for fused quartz powder 18.

An elongated electrical resistor means 19, e.g., of carbon or graphite, which may be of tubular or solid form, is mounted in the quartz tube 10 spaced therefrom and coaxially thereof. Electrodes 20 and 21 are connected to opposite ends of the resistor 19. Vacuum means comprising a conduit 22 is mounted on the housing 1 and communicates with an aperture 23 through the housing wall for vacuumizing the annular charge chamber 17. A filter means 24 is associated with the aperture 23 as illustrated. While the closure means including end plates 4 and 6 and their associated gaskets 15 and 16 and O-rings 8 and 9 maintain the charge chamber 17 under vacuum when applied through vacuum conduit 22, the inner space of the quartz tube 10 is open to or exposed to either ambient atmospheric air pressure or otherwise to an atmosphere of controlled pressure and chemical composition suitably applied. The quartz tube 10 is provided with circular quartz flanges 25 and 26 each spaced from one end of the tube 10 sufficiently to enable it to be contained by the housing 1 while providing insulation chambers 27 and 28 one between the flange 25 and closure plate 4 and one between the flange 26 and closure plate 6. The insulation chambers contain insulation material, e.g., crushed graphite 29.

Immediately adjacent the inner surface of the container 1 is a porous sleeve which may be in the form of a cylindrical metal screen 30 or a sleeve of powder particles having a size larger than the powder particles of the charge particles 18. The purpose of the screen or sleeve 30 is to provide a means for permitting substantially uniform and complete evacuation of gases from the charge bed along the length thereof. In the absence of such a sleeve there would be an incomplete evacuation of gases characterized by a lesser degree of gas evacuation at locations in the charge bed remote from the vacuum conduit 22.

Since the furnace operates at a high temperature sufficient to fuse the charge bed particles, the furnace is provided with a cooling means in the form of a coolant or water jacket 31 positioned between the flanges 2 and 3 and spaced from the outer wall of housing 1 to provide a space 32 for containing a flowing coolant, e.g., water, entering jacket inlet 33 and leaving jacket outlet 34. Electrode 20 is a hollow electrode having an inner cavity 35, an inlet 36 and outlet 37 and containing a tubular duct 38 communicating with outlet 37. A liquid coolant enters inlet 36, passes into cavity 35, into one end 39 of duct 38 and out through outlet 37. The other electrode 21 is a hollow electrode having an inner cavity 40, inlet 41 and an outlet 42 and containing a tubular duct 43 communicating with the outlet 42. A liquid coolant enters inlet 41, passes into cavity 40, into one end 44 of duct 43 and out through outlet 42.

In addition to the cooling of the housing wall and electrodes, the closure plates 4 and 6 are each provided with one cooling chamber 45 and 46 mounted on the external surfaces thereof as illustrated. Chamber 45 is provided with a fluid inlet 47 and a fluid outlet 48. Chamber 46 is provided with a fluid inlet 49 and fluid outlet 50.

In operation, while the furnace is under both heat and vacuum, the charge particles of fused quartz begin to fuse on the outside wall of fused quartz tube 10 due to the heat supplied within the tube by electrical resistor 19. Because of the porous sleeve 30, which permits the passage of gases therethrough more freely than through the quartz powder charge material 18, uniform vacuum is able to reach throughout the length of the charge bed. As the powder charge particles adjacent the tube 10 fuse onto the tube, the vacuum in the housing assisted by the gas or air pressure inside the tube 10 causes the tube 10 to gradually swell outwardly while constantly picking up greater thickness of the newly depositing fused quartz as illustrated by the broken lines showing the substantially completed slug 10. The process continues until a predetermined amount of quartz has been deposited on the quartz tube 10. Since the charge bed 18 is under vacuum during operation of the furnace, it will become apparent that no water or gases will be present in the charge bed adjacent the tube 10 to contaminate the newly deposited fused quartz.

I claim:

1. A furnace for making fused quartz hollow slugs comprising a cylindrical tubular-walled housing having a vacuum-tight closure means sealing both ends of the housing, a fused quartz tube mounted in the housing coaxially of and in spaced relationship with the housing, end portions of the fused quartz tube passing through the closure means in vacuum-tight relationship therewith, an annular charge chamber between the fused quartz tube and the wall of the housing, an elongated electrical resistor heating means mounted in the fused quartz tube in spaced relationship therewith and coaxially thereof, the fused quartz tube being open at the ends thereof to an external atmosphere, and a vacuum conduit communicating with the charge chamber through an aperture through the housing wall.

2. A furnace according to claim 1, comprising electrode means connected to both ends of the elongated reisitor means.

3. A furnace according to claim 1, comprising flanges at both ends of the cylindrical housing, a jacket means positioned between the flanges and spaced from the outer wall of the housing.

4. A furnace according to claim 1, comprising a pair of quartz flanges mounted on the quartz tube, each flange being spaced from one end of the tube sufficiently to enable it to be contained by the housing and providing a chamber between each flange and each housing closure means.

5. A furnace according to claim 1, comprising a porous cylindrical sleeve inside of and coaxial of the housing adjacent the inner surface of the housing wall.

6. A furnace according to claim 5, wherein the sleeve is a metal screen.

7. A furnace according to claim 5, wherein the sleeve is composed of powder particles.

8. A furnace according to claim 1, comprising flanges at both ends of the cylindrical housing, said closure means being plate members each clamped onto one of the flanges in vacuum-tight relationship therewith.

9. A furnace according to claim 1, wherein the resistor means is composed of a material selected from the group consisting of carbon and graphite.

* * * * *